United States Patent

Kumano et al.

[11] Patent Number: 6,047,252
[45] Date of Patent: Apr. 4, 2000

[54] MACHINE TRANSLATION METHOD AND SOURCE/TARGET TEXT DISPLAY METHOD

[75] Inventors: Akira Kumano, Ichihara; Satoshi Kinoshita, Tokyo, both of Japan

[73] Assignee: Kabushiki Kaisha Toshiba, Kawasaki, Japan

[21] Appl. No.: 08/886,153

[22] Filed: Jun. 30, 1997

[30]    Foreign Application Priority Data

Jun. 28, 1996  [JP]  Japan .................................. 8-170367
Jul. 23, 1996  [JP]  Japan .................................. 8-193485

[51] Int. Cl.⁷ ..................................................... G06F 17/28
[52] U.S. Cl. ..................................................... 704/2; 704/5
[58] Field of Search ........................... 704/2–7; 707/51 B, 707/536; 345/115; 395/200.48, 200.36

[56]              References Cited

U.S. PATENT DOCUMENTS

| | | | |
|---|---|---|---|
| 4,599,612 | 7/1986 | Kaji et al. ..................................... | 704/3 |
| 4,791,587 | 12/1988 | Doi ............................................... | 704/2 |
| 4,866,670 | 9/1989 | Adachi et al. .............................. | 704/5 |
| 4,894,779 | 1/1990 | Suzuki et al. .............................. | 704/5 |
| 5,091,876 | 2/1992 | Kumano et al. ............................ | 704/2 |
| 5,349,368 | 9/1994 | Takeda et al. ............................. | 704/3 |
| 5,351,189 | 9/1994 | Doi et al. .................................... | 704/3 |
| 5,373,442 | 12/1994 | Kutsumi et al. ............................ | 704/3 |
| 5,587,902 | 12/1996 | Kugimiya ................................... | 704/2 |
| 5,608,622 | 3/1997 | Church ........................................ | 704/2 |
| 5,612,872 | 3/1997 | Fujita .......................................... | 704/2 |
| 5,659,765 | 8/1997 | Nii ............................................... | 704/2 |
| 5,854,997 | 12/1998 | Sukeda et al. .............................. | 704/3 |

*Primary Examiner*—Forester W. Isen
*Assistant Examiner*—Patrick N. Edouard
*Attorney, Agent, or Firm*—Oblon, Spivak, McClelland, Maier & Neustadt, P.C.

[57]              ABSTRACT

A source text output file provided with link information for a plurality of component units of a second language text corresponding to the component units of a first language text is obtained and a target text output file provided with link information for a plurality of component units of the first language text corresponding to the component units of the second language text is obtained. The obtained source text output file and target text output file are supplied to a display means and both the source text and the target text are displayed in correspondence with each other for example on an existing single Internet browser by use of a specification of an existing hyper text. More specifically, the first language text and the second language text are displayed in separate fields (windows) on the above browser, only the first language text or the second language text is scrolled according to user request, and a component unit of the second language text or the first language text corresponding to the first language text or the second language text currently being displayed is displayed.

15 Claims, 29 Drawing Sheets

```
<LABEL INFORMATION "#S001"> <TARGET TEXT LINK INFORMATION "#T001">
1997年5月 報道発表

<LABEL INFORMATION "#S002"> <TARGET TEXT LINK INFORMATION "#T002">
ホームパソコン新製品 ABCDE

<LABEL INFORMATION "#S003"> <TARGET TEXT LINK INFORMATION "#T003">
XYZ社、テレビに簡単に接続できるホームパソコン ABCDE を発表

<LABEL INFORMATION "#S004"> <TARGET TEXT LINK INFORMATION "#T004">
XYZ 社は、本日、コンパクトなホームパソコン ABCDE を発表し、ホームコンピ
ュータに、新コンセプトを導入。
ABCDE は、テレビやＡＶアンプなどのＡＶ機器やパソコン用ディスプレイに簡
単に接続でき、持ち運びもできるコンパクトな設計で可搬性に優れているため
家庭内で手軽に楽しめます。
映画などのＤＶＤタイトルソフトをはじめパソコン用ソフト、インターネット
等を、家族やグループでも手軽に楽しむことができます。
日本国内で、6月10日から発売します。

<LABEL INFORMATION "#S005"> <TARGET TEXT LINK INFORMATION "#T005">
ABCDE は、拡張性やコストパフォーマンスに優れています。
新製品は、従来のデスクトップパソコンと比べ容積約4分の1、重さ約3分の
 1（幅 262mm 奥行 269mm 高さ 88mm、重さ約3．9 kg）を実現した世界最小・
最軽量のホームパソコンです。
133MHz プロセッサ、３２ＭＢのメインメモリ、１．４ＧＢの大容量ハードディ
スクドライブ、高性能３Ｄグラフィックスアクセラレータを標準装備していま
す。
```

FIG. 3

<LABEL INFORMATION "#S006"> <TARGET TEXT LINK INFORMATION "#T006">
ABCDE は、ワイヤレスキーボードやリモコン(ポインティングデバイス付)を装備しており、離れたところからでも操作できます。
テレビやＡＶアンプなどのＡＶ機器やパソコン用ディスプレイに簡単に接続できるビデオ出力ターミナルがあります。

<LABEL INFORMATION "#S007"> <TARGET TEXT LINK INFORMATION "#T007">
新製品は、ＤＶＤ－ＲＯＭドライブを標準で搭載することにより、映画などのＤＶＤタイトルソフトを高画質・高音質で楽しむことができます。
８倍速ＣＤ－ＲＯＭドライブとしても利用でき、数多くのＣＤ－ＲＯＭタイトルも楽しむことができます。
また、高速ボイスＦＡＸモデム(33.6kbps)を搭載するとともに、ワンタッチでインターネットに接続できるインターネットボタンをリモコンに装備しており、高速かつ簡単にインターネットへアクセスすることができます。

<LABEL INFORMATION "#S008"> <TARGET TEXT LINK INFORMATION "#T008">
ABCDE は、ホームパソコンとしての幅広いニーズにも対応しています。
これは、充実したソフトウェアを標準添付していることでわかります。

<LABEL INFORMATION "#S009"> <TARGET TEXT LINK INFORMATION "#T009">
Copyright(C) 1995 - 1997 XYZ社　著作権保有

F I G. 4

```
<LABEL INFORMATION "#T001"> <SOURCE TEXT LINK INFORMATION "#S001">
Press Release May, 1997

<LABEL INFORMATION "#T002"> <SOURCE TEXT LINK INFORMATION "#S002">
New Home PC ABCDE <LABEL INFORMATION "#T003"> <SOURCE TEXT LINK INFORMATION "#S003">
XYZ Introduces Home PC ABCDE For Easy Connection To a TV <LABEL INFORMATION "#T004"> <SOURCE TEXT LINK INFORMATION "#S004">
XYZ Corporation today introduced a new concept in home computing by
announcing ABCDE , a very compact multimedia home PC.
ABCDE, easily connectable to a TV, other audiovisual (AV) equipment,
or PC monitor, achieves the true convergence of computing and home
entertainment.
It can be carried and flexibly installed anywhere in a room, and
allows
users to enjoy DVD movie titles, a wide range of PC software, surfing
the Internet, etc.
It will be introduced in the Japanese market from June 10.

<LABEL INFORMATION "#T005"> <SOURCE TEXT LINK INFORMATION "#S005">
ABCDE offers superior expandability and performance in a compact body.
Compared to standard desktop computers, its volume is only around a
quarter (262mm(W) 269(D) 88(H)), and its weight about one third at
around 3.9kg, making it one of the world's smallest, lightest home
personal computer.
It is equipped with 133 MHz processor, 32 MB main memory, 1.4 GB
large-capacity hard disk drive, and high-performance 3D graphics
accelerator.
```

FIG. 5

```
<LABEL INFORMATION "#T006"> <SOURCE TEXT LINK INFORMATION "#S006">
ABCDE comes with a wireless keyboard and remote controller with a
pointing device which allow users to remotely access the computer
from anywhere in the room.
It utilizes composite video output terminal for easy connection to
TVs and AV amplifiers, and also has an RGB output terminal for
connection to a personal computer display.

<LABEL INFORMATION "#T007"> <SOURCE TEXT LINK INFORMATION "#S007">
ABCDE incorporates a DVD-ROM drive, and is ideal for people who desire
the excellent visual and audio performance of DVD software.
Because it doubles as an 8-times rotational speed CD-ROM drive,
users can also enjoy a rich variety of CD-ROM software and music CDs.
With ABCDE, users can access the Internet easily and fast thanks to
the high-speed voice fax modem (33.6 kbps), and remote controller with
one touch button for Internet access.

<LABEL INFORMATION "#T008"> <SOURCE TEXT LINK INFORMATION "#S008">
ABCDE is designed to be a home computer in the fullest sense,
addressing the widest possible range of needs.
This is reflected in the array of pre-installed software and packaged
software bundled with the computer.

<LABEL INFORMATION "#T009"> <SOURCE TEXT LINK INFORMATION "#S009">
Copyright(C) 1995 - 1997 XYZ CORPORATION. All Rights Reserved.
```

210 — ☆ 1997年5月 報道発表
210 — ☆ ホームパソコン新製品 ABCDE
210 — ☆ XYZ、テレビに簡単に接続できるホームパソコン ABCDE を発表
210 — ☆ XYZ 社は、本日、コンパクトなホームパソコン ABCDE を発表し、ホームコンピュータに新コンセプトを導入。ABCDE は、テレビやAVアンプなどのAV機器やパソコン用ディスプレイに簡単に接続でき、持ち運びもできるコンパクトな設計で可搬性に優れているため家庭内で手軽に楽しめます。映画などのDVDタイトルソフトをはじめパソコン用ソフト、インターネット等を、家族やグループでも手軽に楽しむことができます。日本国内で、6月10日から発売します。

212 — ☆ Press Release May, 1997
212 — ☆ New Home PC ABCDE
212 — ☆ XYZ Introduces Home PC ABCDE For Easy Connection To a TV
212 — ☆ XYZ Corporation today introduced a new concept in home computing by announcing ABCDE, a very compact multimedia home PC. ABCDE, easily connectable to a TV, other audiovisual (AV) equipment, or PC monitor, achieves the true convergence of computing and home entertainment. It can be carried and flexibly installed anywhere in a room, and allows users to enjoy DVD movie titles, a wide range of PC software, surfing the Internet, etc. It will be introduced in the Japanese market from June 10.

☆ XYZ 社は、本日、コンパクトなホームパソコン ABCDE を発表し、ホームコンピュータに新コンセプトを導入。ABCDE は、テレビや AV アンプなどの AV 機器やパソコン用ディスプレイに簡単に接続でき、持ち運びもできるコンパクトな設計で可搬性に優れているため家庭内で手軽に楽しめます。映画などの DVD タイトルソフトをはじめパソコン用ソフト、インターネット等を、家族やグループでも手軽に楽しむことができます。日本国内で、6月10日から発売します。

☆ ABCDE は、拡張性やコストパフォーマンスに優れています。新製品は、従来のデスクトップパソコンと比べ容積約4分の1、重さ約3分の1（幅 262mm 奥行 269mm 高さ 88mm、重さ約 3.9 kg）を実現した世界最小・最軽量のホームパソコンです。133MHz プロセッサ、32MB のメインメモリ、1.4GB の大容量ハードディスクドライブ、高性能 3D グラフィックスアクセラレータを標準装備しています。

☆ Press Release May, 1997

☆ New Home PC ABCDE

☆ XYZ Introduces Home PC ABCDE For Easy Connection To a TV

☆ XYZ Corporation today introduced a new concept in home computing by announcing ABCDE, a very compact multimedia home PC. ABCDE, easily connectable to a TV, other audiovisual (AV) equipment, or PC monitor, achieves the true convergence of computing and home entertainment. It can be carried and flexibly installed anywhere in a room, and allows users to enjoy DVD movie titles, a wide range of PC software, surfing the Internet, etc. It will be introduced in the Japanese market from June 10.

214

☆ XYZ社は、本日、コンパクトなホームパソコン ABCDE を発表し、ホームコンピュータに、新コンセプトを導入。ABCDE は、テレビやAVアンプなどのAV機器やパソコン用ディスプレイに簡単に接続でき、持ち運びもできるコンパクトな設計で可搬性に優れているため家庭内でも手軽に楽しめます。映画などのDVDタイトルソフトをはじめとするパソコン用ソフト、インターネット等を、家族やグループでも手軽に楽しむことができます。日本国内で、6月10日から発売します。

☆ ABCDE は、拡張性やコストパフォーマンスに優れています。新製品は、従来のデスクトップパソコンと比べ容積約4分の1、重さ約3分の1 (幅262mm 奥行269mm 高さ88mm、重さ約3.9kg) を実現した世界最小・最軽量のホームパソコンです。133MHz プロセッサ、32MBのメインメモリ、1.4GBの大容量ハードディスクドライブ、高性能3Dグラフィックスアクセラレータを標準装備しています。

☆ ABCDE incorporates a DVD-ROM drive, and is ideal for people who desire the excellent visual and audio performance of DVD software. Because it doubles as an 8-times rotational speed CD-ROM drive, users can also enjoy a rich variety of CD-ROM software and music CDs. With ABCDE, users can access the Internet easily and fast thanks to the high-speed voice fax modem (33.6 kbps), and remote controller with one touch button for Internet access.

☆ ABCDE is designed to be a home computer in the fullest sense, addressing the widest possible range of needs. This is reflected in the array of pre-installed software and packaged software bundled with the computer.

F I G. 10

```
<HTML>
<BODY>
<A HREF="file:yakubun.html#T001" NAME="S001"><IMG SRC="file:star.gif"></A>
1997年5月 報道発表
<BR>
<A HREF="file:yakubun.html#T002" NAME="S002"><IMG SRC="file:star.gif"></A>
ホームパソコン新製品 ABCDE
<BR>
<A HREF="file:yakubun.html#T003" NAME="S003"><IMG SRC="file:star.gif"></A>
XYZ社、テレビに簡単に接続できるホームパソコン ABCDE を発表
<BR>
<A HREF="file:yakubun.html#T004" NAME="S004"><IMG SRC="file:star.gif"></A>
XYZ社は、本日、コンパクトなホームパソコン ABCDE を発表し、ホームコンピュータに、新コンセプトを導入。ABCDE は、テレビやＡＶアンプなどのＡＶ機器やパソコン用ディスプレイに簡単に接続でき、持ち運びもできるコンパクトな設計で可搬性に優れているため家庭内で手軽に楽しめます。映画などのＤＶＤタイトルソフトをはじめパソコン用ソフト、インターネット等を、家族やグループでも手軽に楽しむことができます。日本国内で、6月10日から発売します。
<BR>
<A HREF="file:yakubun.html#T005" NAME="S005"><IMG SRC="file:star.gif"></A>
ABCDE は、拡張性やコストパフォーマンスに優れています。新製品は、従来のデスクトップパソコンと比べ容積約4分の1、重さ約3分の1（幅262mm 奥行 269mm 高さ 88mm、重さ約3．9 kg）を実現した世界最小・最軽量のホームパソコンです。133MHz プロセッサ、３２ＭＢのメインメモリ、１．４ＧＢの大容量ハードディスクドライブ、高性能３Ｄグラフィックスアクセラレータを標準装備しています。
<BR>
```

F I G. 14

```
<A HREF="file:yakubun.html#T006" NAME="S006"><IMG SRC="file:star.gif"></A>
```
ABCDE は、ワイヤレスキーボードやリモコン(ポインティングデバイス付)を装備しており、離れたところからでも操作できます。テレビやＡＶアンプなどのＡＶ機器やパソコン用ディスプレイに簡単に接続できるビデオ出力ターミナルがあります。
```
<BR>
<A HREF="file:yakubun.html#T007" NAME="S007"><IMG SRC="file:star.gif"></A>
```
新製品は、ＤＶＤ－ＲＯＭドライブを標準で搭載することにより、映画などのＤＶＤタイトルソフトを高画質・高音質で楽しむことができます。８倍速ＣＤ－ＲＯＭドライブとしても利用でき、数多くのＣＤ－ＲＯＭタイトルも楽しむことができます。また、高速ボイスＦＡＸモデム（33.6kbps）を搭載するとともに、ワンタッチでインターネットに接続できるインターネットボタンをリモコンに装備しており、高速かつ簡単にインターネットへアクセスすることができます。
```
<BR>
<A HREF="file:yakubun.html#T008" NAME="S008"><IMG SRC="file:star.gif"></A>
```
ABCDE は、ホームパソコンとしての幅広いニーズにも対応しています。これは、充実したソフトウェアを標準添付していることでわかります。
```
<BR>
<A HREF="file:yakubun.html#T009" NAME="S009"><IMG SRC="file:star.gif"></A>
```
Copyright(C) 1995 - 1997 XYZ 社　著作権保有
```
</BODY>
</HTML>
```

FIG. 15

```
<HTML>
<BODY>
<A HREF="file:genbun.html#S001" NAME="T001"><IMG SRC="file:star.gif"></A>
Press Release May, 1997
<BR>
<A HREF="file:genbun.html#S002" NAME="T002"><IMG SRC="file:star.gif"></A>
New Home PC ABCDE
<BR>
<A HREF="file:genbun.html#S003" NAME="T003"><IMG SRC="file:star.gif"></A>
XYZ Introduces Home PC ABCDE For Easy Connection To a TV
<BR>
<A HREF="file:genbun.html#S004" NAME="T004"><IMG SRC="file:star.gif"></A>
XYZ Corporation today introduced a new concept in home computing by
announcing ABCDE , a very compact multimedia home PC.
ABCDE, easily connectable to a TV, other audiovisual (AV) equipment,
or PC monitor, achieves the true convergence of computing and home
entertainment.
It can be carried and flexibly installed anywhere in a room, and allows
users to enjoy DVD movie titles, a wide range of PC software, surfing
the Internet, etc.
It will be introduced in the Japanese market from June 10.
<BR>
<A HREF="file:genbun.html#S005" NAME="T005"><IMG SRC="file:star.gif"></A>
ABCDE offers superior expandability and performance in a compact body.
Compared to standard desktop computers, its volume is only around a
quarter (262mm(W) 269(D) 88(H)), and its weight about one third at
around 3.9kg, making it one of the world's smallest, lightest home
personal computer.
It is equipped with 133 MHz processor, 32 MB main memory, 1.4 GB
large-capacity hard disk drive, and high-performance 3D graphics
accelerator.
<BR>
```

FIG. 16

```
<A HREF="file:genbun.html#S006" NAME="T006"><IMG SRC="file:star.gif"></A>
ABCDE comes with a wireless keyboard and remote controller with a
pointing device which allow users to remotely access the computer
from anywhere in the room.
It utilizes composite video output terminal for easy connection to
TVs and AV amplifiers, and also has an RGB output terminal for connection
to a personal computer display.
<BR>
<A HREF="file:genbun.html#S007" NAME="T007"><IMG SRC="file:star.gif"></A>
ABCDE incorporates a DVD-ROM drive, and is ideal for people who desire
the excellent visual and audio performance of DVD software.
Because it doubles as an 8-times rotational speed CD-ROM drive,
users can also enjoy a rich variety of CD-ROM software and music CDs.
With ABCDE, users can access the Internet easily and fast thanks to
the high-speed voice fax modem (33.6 kbps), and remote controller with
one touch button for Internet access.
<BR>
<A HREF="file:genbun.html#S008" NAME="T008"><IMG SRC="file:star.gif"></A>
ABCDE is designed to be a home computer in the fullest sense, addressing
the widest possible range of needs.
This is reflected in the array of pre-installed software and packaged
software bundled with the computer.
<BR>
<A HREF="file:genbun.html#S009" NAME="T009"><IMG SRC="file:star.gif"></A>
Copyright(C) 1995 - 1997 XYZ CORPORATION. All Rights Reserved.
</BODY>
</HTML>
```

FIG. 17

<<LABEL INFORMATION "#S001">> <<TARGET TEXT LINK INFORMATION "#T001">>
1997年5月 報道発表

<<LABEL INFORMATION "#S002">> <<TARGET TEXT LINK INFORMATION "#T002">>
ホームパソコン新製品 ABCDE

<<LABEL INFORMATION "#S003">> <<TARGET TEXT LINK INFORMATION "#T003">>
XYZ社、テレビに簡単に接続できるホームパソコン ABCDE を発表

<<LABEL INFORMATION "#S004">> <<TARGET TEXT LINK INFORMATION "#T004">>
<LABEL INFORMATION "#S004-1"> <TARGET TEXT LINK INFORMATION "#T004-1">
XYZ社は、本日、コンパクトなホームパソコン ABCDE を発表し、ホームコンピュータに、新コンセプトを導入。
<LABEL INFORMATION "#S004-2"> <TARGET TEXT LINK INFORMATION "#T004-2">
ABCDE は、テレビやＡＶアンプなどのＡＶ機器やパソコン用ディスプレイに簡単に接続でき、持ち運びもできるコンパクトな設計で可搬性に優れているため家庭内で手軽に楽しめます。
<LABEL INFORMATION "#S004-3"> <TARGET TEXT LINK INFORMATION "#T004-3">
映画などのＤＶＤタイトルソフトをはじめパソコン用ソフト、インターネット等を、家族やグループでも手軽に楽しむことができます。
<LABEL INFORMATION "#S004-4"> <TARGET TEXT LINK INFORMATION "#T004-4">
日本国内で、6月10日から発売します。

F I G. 18

<<LABEL INFORMATION "#S005">> <<TARGET TEXT LINK INFORMATION "#T005">>
<LABEL INFORMATION "#S005-1"> <TARGET TEXT LINK INFORMATION "#T005-1">
ABCDE は、拡張性やコストパフォーマンスに優れています。
<LABEL INFORMATION "#S005-2"> <TARGET TEXT LINK INFORMATION "#T005-2">
新製品は、従来のデスクトップパソコンと比べ容積約４分の１、重さ約３分の
１（幅 262mm 奥行 269mm 高さ 88mm、重さ約３．９ kg）を実現した世界最小・
最軽量のホームパソコンです。
<LABEL INFORMATION "#S005-3"> <TARGET TEXT LINK INFORMATION "#T005-3">
133MHz プロセッサ、３２ＭＢのメインメモリ、１．４ＧＢの大容量ハードディ
スクドライブ、高性能３Ｄグラフィックスアクセラレータを標準装備していま
す。

<<LABEL INFORMATION "#S006">> <<TARGET TEXT LINK INFORMATION "#T006">>
<LABEL INFORMATION "#S006-1"> <TARGET TEXT LINK INFORMATION "#T006-1">
ABCDE は、ワイヤレスキーボードやリモコン(ポインティングデバイス付)を装
備しており、離れたところからでも操作できます。
<LABEL INFORMATION "#S006-2"> <TARGET TEXT LINK INFORMATION "#T006-2">
テレビやＡＶアンプなどのＡＶ機器やパソコン用ディスプレイに簡単に接続で
きるビデオ出力ターミナルがあります。

<<LABEL INFORMATION "#S007">> <<TARGET TEXT LINK INFORMATION "#T007">>
<LABEL INFORMATION "#S007-1"> <TARGET TEXT LINK INFORMATION "#T007-1">
新製品は、ＤＶＤ－ＲＯＭドライブを標準で搭載することにより、映画などの
ＤＶＤタイトルソフトを高画質・高音質で楽しむことができます。
<LABEL INFORMATION "#S007-2"> <TARGET TEXT LINK INFORMATION "#T007-2">
８倍速ＣＤ－ＲＯＭドライブとしても利用でき、数多くのＣＤ－ＲＯＭタイト
ルも楽しむことができます。
<LABEL INFORMATION "#S007-3"> <TARGET TEXT LINK INFORMATION "#T007-3">
また、高速ボイスＦＡＸモデム（33.6kbps）を搭載するとともに、ワンタッチ
でインターネットに接続できるインターネットボタンをリモコンに装備してお
り、高速かつ簡単にインターネットへアクセスすることができます。

FIG. 19

```
<<LABEL INFORMATION "#S008">> <<TARGET TEXT LINK INFORMATION "#T008">>
<LABEL INFORMATION "#S008-1"> <TARGET TEXT LINK INFORMATION "#T008-1">
ABCDE は、ホームパソコンとしての幅広いニーズにも対応しています。
<LABEL INFORMATION "#S008-2"> <TARGET TEXT LINK INFORMATION "#T008-2">
これは、充実したソフトウェアを標準添付していることでわかります。

<<LABEL INFORMATION "#S009">> <<TARGET TEXT LINK INFORMATION "#T009">>
Copyright(C) 1995 - 1997 XYZ 社　著作権保有
```

FIG. 20

```
<<LABEL INFORMATION "#T001">>  <<SOURCE TEXT LINK INFORMATION "#S001">>
Press Release May, 1997

<<LABEL INFORMATION "#T002">>  <<SOURCE TEXT LINK INFORMATION "#S002">>
New Home PC ABCDE <<LABEL INFORMATION "#T003">>  <<SOURCE TEXT LINK INFORMATION "#S003">>
XYZ Introduces Home PC ABCDE For Easy Connection To a TV <<LABEL INFORMATION "#T004">>  <<SOURCE TEXT LINK INFORMATION "#S004">>
<LABEL INFORMATION "#T004-1"> <SOURCE TEXT LINK INFORMATION "#S004-1">
XYZ Corporation today introduced a new concept in home computing by
announcing ABCDE , a very compact multimedia home PC.
<LABEL INFORMATION "#T004-2"> <SOURCE TEXT LINK INFORMATION "#S004-2">
ABCDE, easily connectable to a TV, other audiovisual (AV) equipment,
or PC monitor, achieves the true convergence of computing and home
entertainment.
<LABEL INFORMATION "#T004-3"> <SOURCE TEXT LINK INFORMATION "#S004-3">
It can be carried and flexibly installed anywhere in a room, and
allows
users to enjoy DVD movie titles, a wide range of PC software, surfing
the Internet, etc.
<LABEL INFORMATION "#T004-4"> <SOURCE TEXT LINK INFORMATION "#S004-4">
It will be introduced in the Japanese market from June 10.
```

FIG. 21

<<LABEL INFORMATION "#T005">> <<SOURCE TEXT LINK INFORMATION "#S005">>
<LABEL INFORMATION "#T005-1"> <SOURCE TEXT LINK INFORMATION "#S005-1">
ABCDE offers superior expandability and performance in a compact body.
<LABEL INFORMATION "#T005-2"> <SOURCE TEXT LINK INFORMATION "#S005-2">
Compared to standard desktop computers, its volume is only around a
quarter (262mm(W) 269(D) 88(H)), and its weight about one third at
around 3.9kg, making it one of the world's smallest, lightest home
personal computer.
<LABEL INFORMATION "#T005-3"> <SOURCE TEXT LINK INFORMATION "#S005-3">
It is equipped with 133 MHz processor, 32 MB main memory, 1.4 GB
large-capacity hard disk drive, and high-performance 3D graphics
accelerator.

<<LABEL INFORMATION "#T006">> <<SOURCE TEXT LINK INFORMATION "#S006">>
<LABEL INFORMATION "#T006-1"> <SOURCE TEXT LINK INFORMATION "#S006-1">
ABCDE comes with a wireless keyboard and remote controller with a
pointing device which allow users to remotely access the computer
from anywhere in the room.
<LABEL INFORMATION "#T006-2"> <SOURCE TEXT LINK INFORMATION "#S006-2">
It utilizes composite video output terminal for easy connection to
TVs and AV amplifiers, and also has an RGB output terminal for
connection
to a personal computer display.

<<LABEL INFORMATION "#T007">> <<SOURCE TEXT LINK INFORMATION "#S007">>
<LABEL INFORMATION "#T007-1"> <SOURCE TEXT LINK INFORMATION "#S007-1">
ABCDE incorporates a DVD-ROM drive, and is ideal for people who desire
the excellent visual and audio performance of DVD software.
<LABEL INFORMATION "#T007-2"> <SOURCE TEXT LINK INFORMATION "#S007-2">
Because it doubles as an 8-times rotational speed CD-ROM drive,
users can also enjoy a rich variety of CD-ROM software and music CDs.
<LABEL INFORMATION "#T007-3"> <SOURCE TEXT LINK INFORMATION "#S007-3">
With ABCDE, users can access the Internet easily and fast thanks to
the high-speed voice fax modem (33.6 kbps), and remote controller with
one touch button for Internet access.

FIG. 22

<<LABEL INFORMATION "#T008">> <<SOURCE TEXT LINK INFORMATION "#S008">>
<LABEL INFORMATION "#T008-1"> <SOURCE TEXT LINK INFORMATION "#S008-1">
ABCDE is designed to be a home computer in the fullest sense, addressing
the widest possible range of needs.
<LABEL INFORMATION "#T008-2"> <SOURCE TEXT LINK INFORMATION "#S008-2">
This is reflected in the array of pre-installed software and packaged software bundled with the computer.

<<LABEL INFORMATION "#T009">> <<SOURCE TEXT LINK INFORMATION "#S009">>
Copyright(C) 1995 - 1997 XYZ CORPORATION. All Rights Reserved.

FIG. 23

| ◀ ▶ | ◀ ▶ |
|---|---|
| ☆ 1997年5月 報道発表 | ☆ Press Release May, 1997 |
| ☆ ホームパソコン新製品 ABCDE | ☆ New Home PC ABCDE |
| ☆ XYZ、テレビに簡単に接続できるホームパソコン ABCDE を発表 | ☆ XYZ Introduces Home PC ABCDE For Easy Connection To a TV |
| ☆ ◇XYZ社は、本日、コンパクトなホームパソコン ABCDE を発表し、ホームコンピュータに新コンセプトを導入。◇ABCDE は、テレビや AV アンプなどの AV 機器やパソコン用ディスプレイに簡単に接続でき、持ち運びもできるコンパクトな設計で可搬性に優れているため家庭内で手軽に楽しめます。◇映画などの DVD タイトルソフトをはじめパソコン用ソフト、インターネット等を、家族やグループでも手軽に楽しむことができます。◇日本国内で、6月10日から発売します。 | ☆ ◇XYZ Corporation today introduced a new concept in home computing by announcing ABCDE, a very compact multimedia home PC. ◇ABCDE, easily connectable to a TV, other audiovisual (AV) equipment, or PC monitor, achieves the true convergence of computing and home entertainment. It can be carried and flexibly installed anywhere in a room, and allows users to enjoy DVD movie titles, a wide range of PC software, surfing the Internet, etc. ◇It will be introduced in the Japanese market from June 10. |

FIG. 24

☆ ◇XYZ社は、本日、コンパクトなホームパソコン ABCDE を発表し、ホームコンピュータに、新コンセプトを導入。◇ABCDE は、テレビやAVアンプなどのAV機器やパソコン用ディスプレイに簡単に接続でき、持ち運びもできるコンパクト設計で可搬性に優れているため家庭内で手軽に楽しめます。◆映画などのDVDタイトルソフトをはじめパソコン用ソフト、インターネット等を、家族やグループでも手軽に楽しむことができます。◇日本国内で、6月10日から発売します。

☆ ◇ABCDE は、拡張性やコストパフォーマンスに優れています。◇新製品は、従来のデスクトップパソコンと比べ容積約4分の1、重さ約3分の1（幅262mm 奥行269mm 高さ88mm、重さ約3.9kg）を実現した世界最小・最軽量のホームパソコンです。◇133MHz プロセッサ、32MBのメインメモリ、1.4GBの大容量ハードディスクドライブ、高性能3Dグラフィックスアクセラレータを標準装備しています。

◇computing and home entertainment. ◇It can be carried and flexibly installed anywhere in a room, and allows users to enjoy DVD movie titles, a wide range of PC software, surfing the Internet, etc. ◇It will be introduced in the Japanese market from June 10.

☆ ◇ABCDE offers superior expandability and performance in a compact body. ◇Compared to standard desktop computers, its volume is only around a quarter (262mm(W) 269(D) 88(H)), and its weight about one third at around 3.9kg, making it one of the world's smallest, lightest home personal computer. ◇It is equipped with 133 MHz processor, 32 MB main memory, 1.4 GB large-capacity hard disk drive, and high-performance 3D graphics accelerator.

☆ ◇ABCDE comes with a wireless keyboard and remote controller with a pointing device which allow users to remotely access the computer from anywhere in the room. ◇It utilizes composite

F I G. 26

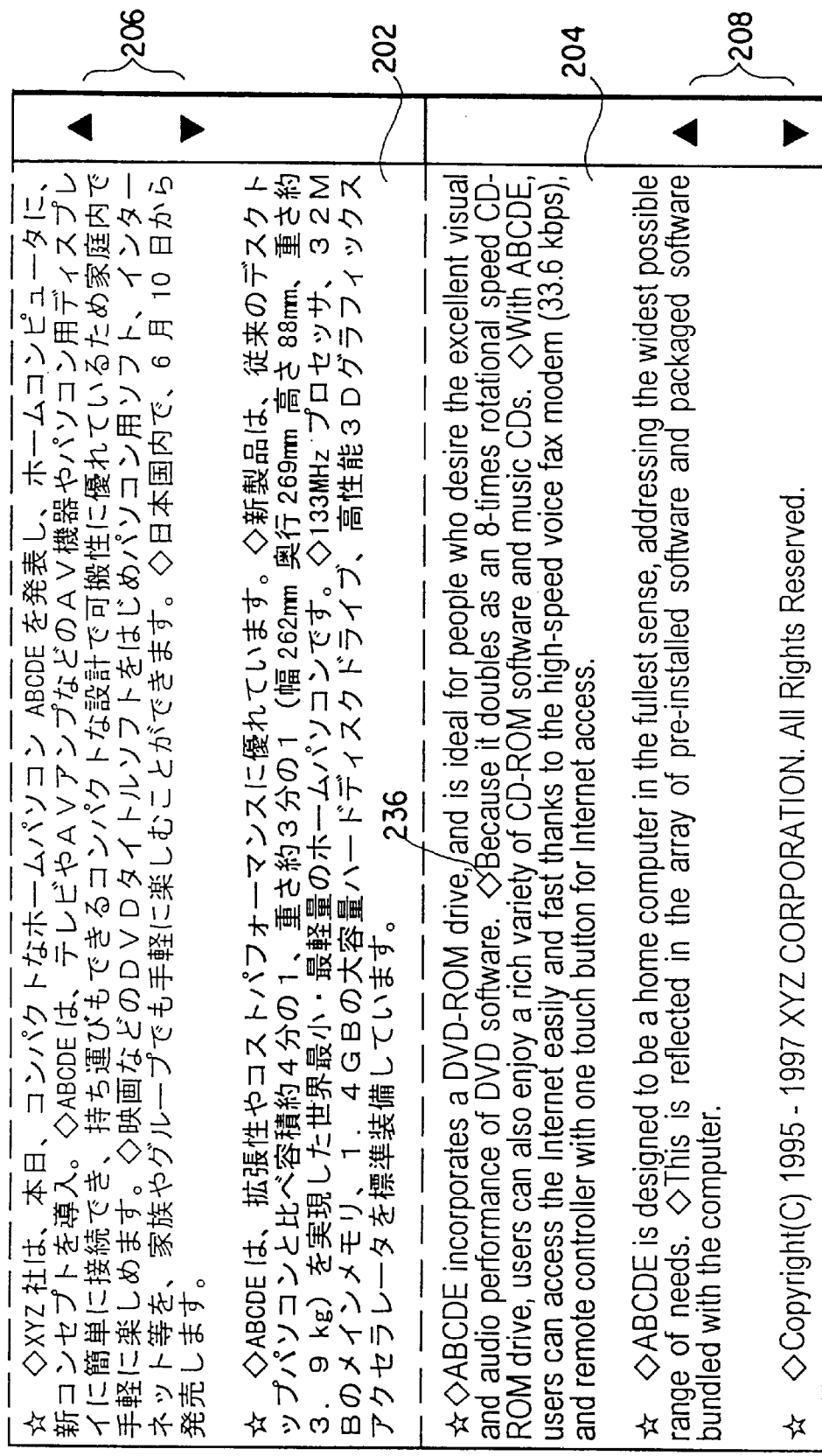

MACHINE TRANSLATION METHOD AND SOURCE/TARGET TEXT DISPLAY METHOD

BACKGROUND OF THE INVENTION

This invention relates to a machine translation method and source/target text display method.

With recent progress in machine translation technology, machine translation has been effectively used. Recently, in addition to machine translation on source text input from a keyboard, floppy disk or optical reader into a computer, an opportunity of machine translation for text obtained through a network has been increased. Particularly because the Internet provides ample information written in various languages, generally internet browsers provided with translation functions have been utilized by the public.

When a result of machine translation of foreign text obtained from Internet is displayed, in many cases, a result of translation is displayed using an existing Internet browser.

However, originally the Internet browsers were not designed to display translation results, but to display a single language text. Thus, when it is necessary to display both a source text and its target text, some devices have been taken.

For example, two Internet browsers are activated on a computer at the same time and a source text is displayed by one browser while its target text is displayed by the other browser. However, according to this method, the browser for displaying the source text and the other browser for displaying the target text are activated completely independently. Thus automatic display of a target text browser (or source text browser) corresponding to a part displayed in the source browser (or target text browser) could not be realized. That is, according to this method, because corresponding parts of the source text and target text are displayed in each browser at the same time, scrolling of the source text and the target text must be carried out independently, so that the operation for this procedure becomes complicated, which is a problem of conventional methods.

According to another method in the source text and target text are mixedly displayed in a single browser. According to this method, for example, a target text is displayed just after its source text and further a next paragraph and its translated text are displayed. That is, some unit of the source text and corresponding translated text are displayed so that a correspondence therebetween can be recognized easily. However, according to this method, an amount of text to be displayed in a single screen almost doubles. Further, because the source text and its target text are displayed alternately, an entire stream of the original text cannot be grasped easily. Further, scrolling of the source text and its target text cannot be carried out independently, which is another problem.

The above problems also exist in a case in which the source text input from the keyboard, floppy disk or optical reader into the computer is machine-translated and displayed on a display unit.

BRIEF SUMMARY OF THE INVENTION

According to the conventional art of Internet browsing, when a target text obtained from machine translation and its source text were displayed on a browser or the like, it was not possible to perform a flexible display such as displaying the source text and its target text independently and displaying both in correspondence with each other so that a source/target text display method with which users were satisfied.

The present invention has been proposed to solve the above problem. An object of the present invention is to provide a method for displaying a source text and a target text obtained as a result of machine translation independently on a single display unit (a display tool to be installed on this device is assumed to be, for example, an Internet browser) and more particularly to a machine translation method and a source/target text display method enabling a flexible, high level display or displaying of corresponding parts between the source text and the target text in correspondence with each other.

According to one aspect of the present invention, there is provided a machine translation method in which, a plurality of text files are browsed, and a desired one of the text is selected and translated, said method comprising the steps of: dividing a text of a first language subject to translation into a plurality of component units; generating a plurality of component units of a second language by translating the divided component units of the first language text; adding link information for component units of the second language text to each of the component units of the first language text; and adding link information for component units of the first language text to each of the component units of the second language text.

According to the machine translation method of the present invention, link information for the component unit of the second language text is added to a corresponding component unit of the first language text and at the same time, link information for the component unit of the first language text is added to a corresponding component unit of the second language text. Thus, specialized browsers for the two languages are not necessary and by dividing a display screen to two windows on an existing single display tool, for example, an Internet browser, it is possible to create a file which may be read with a correspondence between the source text and its target text. Thus, by only using an existing hyper text on an existing single Internet browser, it is possible to provide an environment in which the source text and the target text can be displayed in correspondence with each other. Further, the first language text and the second language text can be displayed in separate fields (e.g., windows) of the above browser, depending on user request, only the first language text or the second language text can be scrolled, and a component unit of the second language text or the first language text corresponding to the first language text or the second language text currently being displayed can be displayed.

According to another aspect of the present invention, there is provided a source/target text display method for displaying a component unit of a first language text subject to translation and a second language text which is a result of translation while the component unit of the first language text is supplied with link information for a corresponding component unit of second language text and the component unit of the second language text is supplied with link information for a corresponding component unit of first language text, said method comprising the steps of: displaying the first language text and the second language text in separate display fields; scrolling, when an instruction for scrolling the first language text or the second language text, instructed first language text or second language text; and displaying, when an instruction for displaying a component unit of the second language text or the first language text corresponding to a specified component unit of the first language text or second language text being displayed is input, the component unit of the second language text or first language text according to the link information attached to the specified component unit of the first language text or second language text.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a diagram showing an example of a source text output file;

FIG. 4 is a diagram showing an example of a source text output file;

FIG. 5 is a diagram showing an example of a target text output file;

FIG. 6 is a diagram showing an example of a target text output file;

FIG. 7 is a diagram showing an example of display on the screen;

FIG. 8 is a diagram showing an example of display on the screen;

FIG. 10 is a diagram showing an example of display on the screen;

FIG. 14 is a diagram showing an example of the source text output file in HTML style;

FIG. 15 is a diagram showing an example of the source text output file in HTML style;

FIG. 16 is a diagram showing an example of the target text output file in HTML style;

FIG. 17 is a diagram showing an example of the target text output file in HTML style;

FIG. 18 is a diagram showing an example of the source text file in which units are made hierarchical, according to a second embodiment of the present invention;

FIG. 19 is a diagram showing an example of the source text file in which the units are made hierarchical;

FIG. 20 is a diagram showing an example of the source text file in which the units are made hierarchical;

FIG. 21 is a diagram showing an example of the target text file in which the units are made hierarchical;

FIG. 22 is a diagram showing an example of the target text file in which the units are made hierarchical;

FIG. 23 is a diagram showing an example of the target text file in which the units are made hierarchical;

FIG. 24 is a diagram showing an example of screen display in which the units are made hierarchical;

FIG. 26 is a diagram showing an example of screen display in which the units are made hierarchical;

FIG. 27 is a diagram showing an example of screen display in which the units are made hierarchical;

DETAILED DESCRIPTION OF THE INVENTION

Hereinafter embodiments of the present invention will be described with reference to the accompanying drawings.

In this embodiment, an example of Japanese-English machine translation apparatus in which the source language is Japanese and its target language is English will be described.

[First Embodiment]

Figure 1:
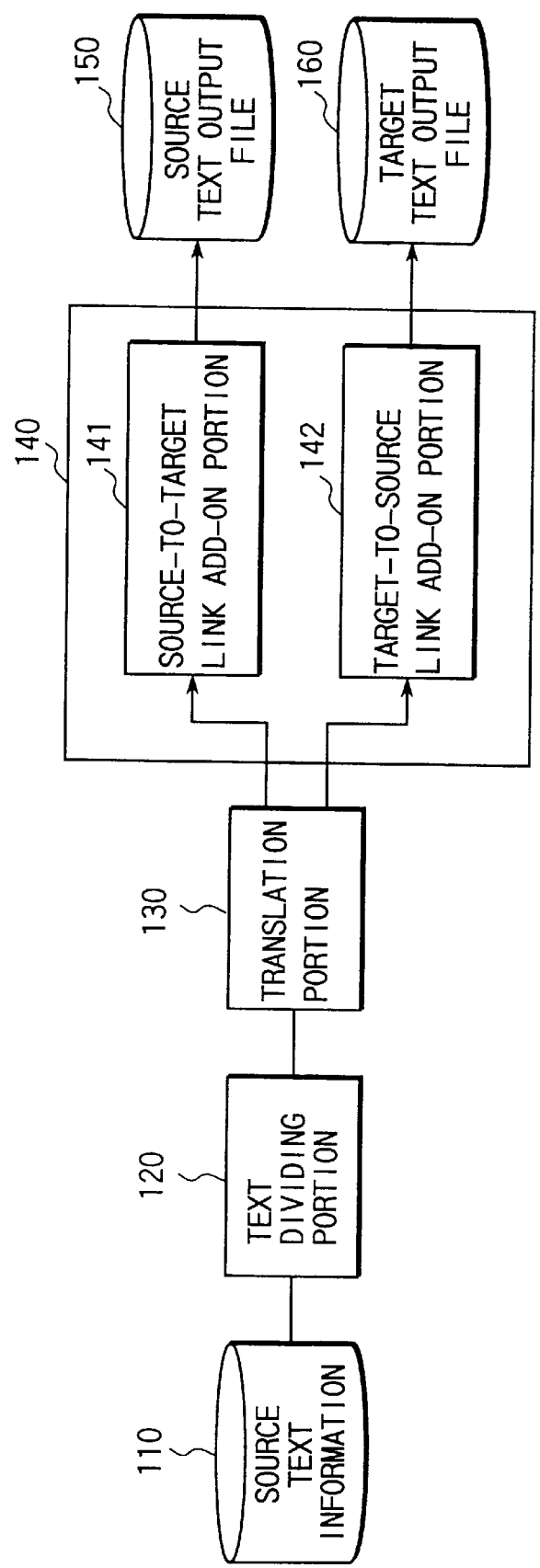
FIG. 1 is a flow chart showing a construction of machine translation apparatus according to a first embodiment of the present invention.

FIG. 1 is a block diagram showing a composition of the machine translation apparatus according to a first embodiment of the present invention.

A machine translation apparatus of the present embodiment comprises a text dividing portion 120, a translation portion 130, and a correspondence linking portion 140. The correspondence link add-on portion 140 includes a source-to-target link add-on portion 141 and a target-to-source link add-on portion 142.

Source text information 110 is Japanese text in this case. This source text information 110 may be for example a plain text or a hyper text input through a network such as Internet.

The text dividing portion 120 divides source text information 110 to predetermined composition units (hereinafter referred to as unit). This unit is a unit for determining a correspondence between the source text information and the target text information, which will be described. The unit has no restriction as long as it is a unit of sentences in general meaning. For example, it is permissible to count a paragraph as a unit or a sentence as a unit.

The translation portion 130 performs machine translation for each unit of the source text output from the text dividing portion 120. The machine translation method is not restricted to any particular method but it is permissible to utilize any method which has been currently known. The translation portion 130 outputs a result of translation of a source text unit in the form of a target text unit.

The corresponding link add-on portion 140 adds information allowing users to refer to the source text and the target text alternately to the source text unit and target text unit output by the translation portion 130. Thus, the corresponding link add-on portion 140 is composed of the source-to-target link add-on portion 141 and the target-to-source link add-on portion 142.

The source-to-target link add-on portion 141 adds information linked with a target text unit corresponding to a source text unit at a head of each of the source text unit. The information linked with the target text unit (target text link information) includes a file name of a target text output file and a unique arbitrary label in the target text file. At the same time, the above label is added to a head of a target text unit corresponding to the source text unit.

The target-to-source link add-on portion 142 adds information linked with a source text unit corresponding to a target text unit to a head of each of the target text units. The information linked with the source text unit (source text link information) includes a file name of the source text output file and a unique arbitrary label in the source text file. At the same time, the above label is added to a head of a source text unit corresponding to the target text unit.

Meanwhile, although each link information is added to the head of each of the respective units, it is permissible to add it to other position, for example, an end thereof.

The source text output file 150 is supplied with the label information and the target text link information and then outputs successively source text units output from the corresponding link add-on portion 140 in a concatenated manner.

The target text output file 160 is supplied with the label information and the source text link information and then outputs successively target text units output from the corresponding link add-on portion 140 in a concatenated manner.

Figure 2:
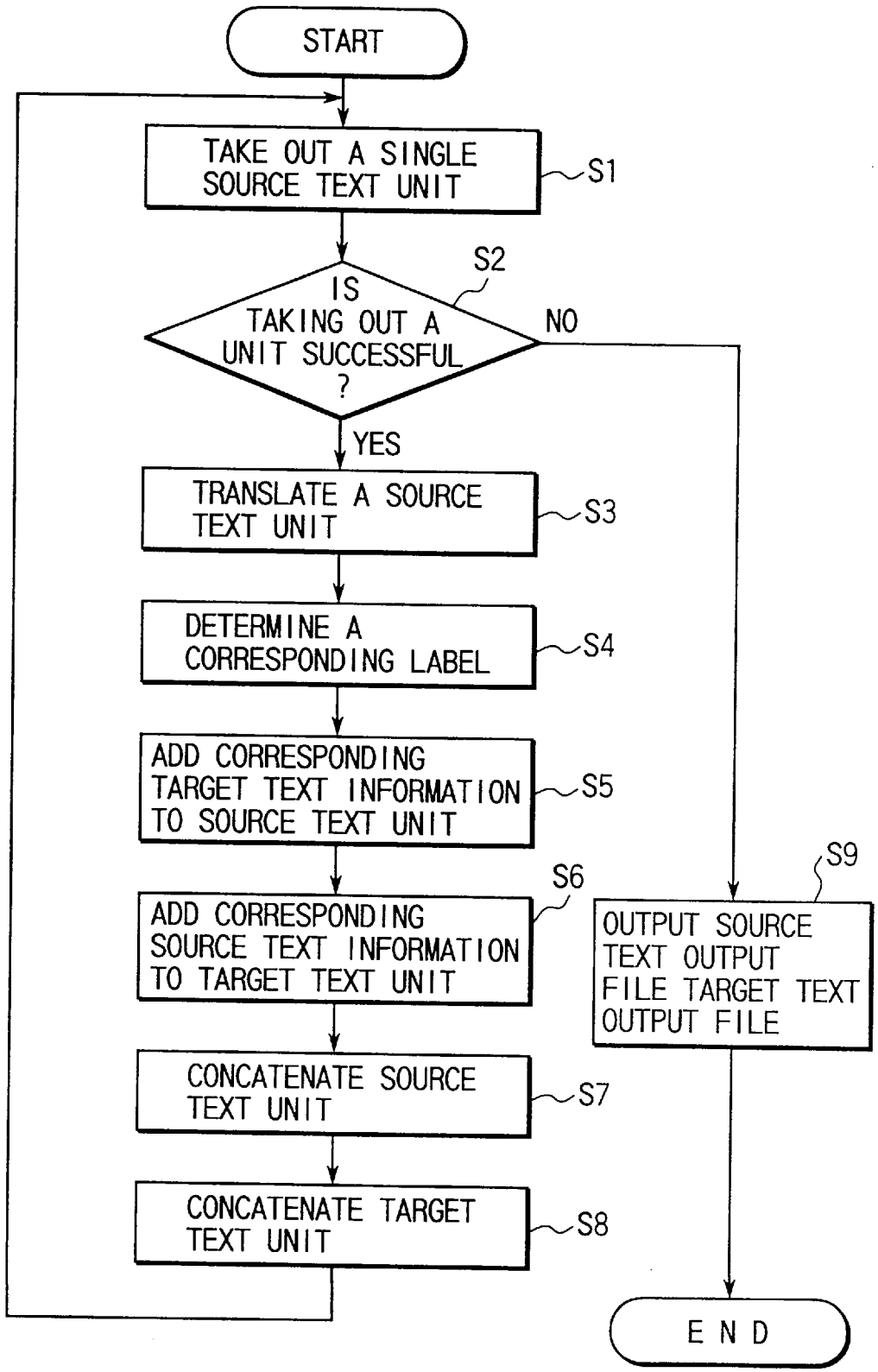
FIG. 2 is a flow chart showing a flow of processing of the machine translation apparatus.

FIG. 2 is a flow chart showing a flow of processing carried out in the machine translation apparatus shown in FIG. 1.

In a first step S1, the text dividing portion 120 picks up a single source text unit from the source text information 110.

In step S2, it is determined whether or not picking out of a single unit in step S1 was successful and if it was successful, the processing proceeds to step S3. If picking out of the unit was not successful because the source text information was terminated, the processing proceeds to step S9.

If YES is answered in step 52, in step S3 the single unit is translated by the translation portion 130 and then a target text unit is output and then the processing proceeds to step S4.

In step S4, labels for corresponding to the source text and target text are determined.

These labels may be of any form as long as they are unique within the source text or target text file. For example, mere numbers such as "0001", "0002", "0003" are permissible and those indicating the content of the unit such as "preface", "introduction" and "background" are also permissible.

In step S5, the source-to-target link add-on portion 141 adds the label determined in step S4 and target text label reference information to the source text unit.

In step S6, the target-to-source link add-on portion 143 adds the label determined in step S4 and source text label reference information to the target text unit.

In step S7, the source text unit to which the information is added in step S5 is concatenated with source text units obtained up to then.

In step S8, the target text unit to which the information is added in step S6 is concatenated with target text units obtained up to then, and then the processing is returned to step S1.

Processings carried out in the above steps S1–S8 are repeated and if NO is answered in step S2, the processing proceeds to step S9.

In step S9, a series of source text units concatenated up to then are output as a source text output file 150 and a series of target text units concatenated up to then are output as a target text output file 160, and then the entire processing is terminated.

In the flow chart shown in FIG. 2, the processings of step S5–step S8 can be replaced or carried out at the same time as long as such a condition that the processing of step S7 is carried out after that of step S5 and the processing of step S8 is carried out after that of step S6.

Here, FIGS. 3 and 4 show an example of the content of the source text output file 150 obtained in the above manner. As shown in FIGS. 3 and 4, a reference label and information linked with a target text unit are added to each source text unit.

FIGS. 5 and 6 show an example of the content of the target text output file 160 obtained in the above manner. As shown in FIGS. 5 and 6, a reference label and information linked with the target text unit are added to each target text unit.

As described above, with respect to a plurality of component units of a first language text (Japanese source text unit in this case), a source text output file in which each link information is added to component units of a second language corresponding thereto (English target text unit here) can be obtained and at the same time, with respect to a plurality of component units of the second language text, a target text output file in which the link information is added to component units of the first language text corresponding thereto.

By supplying the obtained source text output file and the target text output file to a display means, flexible, user-friendly source/target text display which will be described later can be realized. In this case, as a display tool which composes part of the display means, for example, a hyper text browser (e.g., Netscape Navigator) can be utilized.

Here, with reference to a concrete example shown in FIGS. 7–11, a case in which a source text output file and a target text output file output from the machine translation apparatus are displayed such that they correspond to each other by using a hyper text browser will be described.

FIG. 7 shows an initial state of screen division display on a single browser.

The source text is displayed on an upper window 202 and the target text is displayed on a lower window 204 such that respective units are displayed in order from a first unit. Hereinafter, the upper window is called source text window and the lower window is called target text window.

A star symbol 210 attached at a head of each unit in the source text window 202 is a correspondence mark based on link information indicating a correspondence relation from the source text to the target text, which is used for a user's operation.

Likewise, the star symbol 212 attached at a head of each unit of the target text window 204 is a correspondence mark based on link information indicating a correspondence relation from the target text to the source text, which is used for a user's operation.

Scroll bars 206 located at the right end of the source text window 202 are operated by user to scroll a text in the source text window 202.

Likewise, scroll bard 208 located at the right end of the target text window 204 are operated by user to scroll a text in the target text window 204.

Although operation of the scroll bar and star symbol by user can be instructed by clicking a mouse, it is permissible to instruct through a keyboard.

FIG. 8 shows a state in which only the target text has been scrolled by a user's operating the scroll bar 206 in the source text window in FIG. 7. In the source text window 202, the fourth unit is displayed at the top.

Here a target text corresponding to the fourth unit is displayed by clicking a star symbol 214 at the head of the fourth source text unit in the source text window 202.

Figure 9:
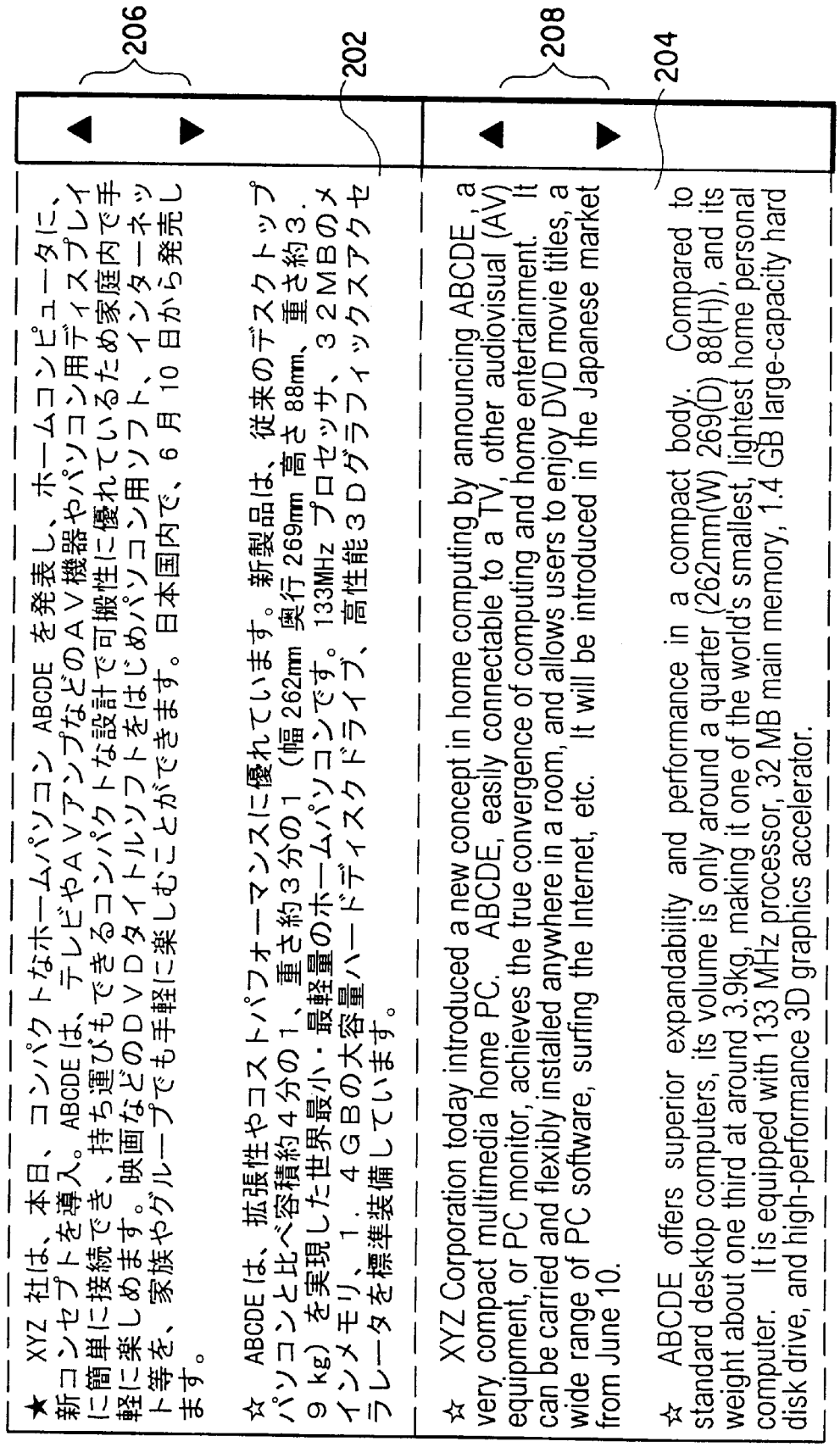
FIG. 9 is a diagram showing an example of display on the screen.

FIG. 9 shows a state just after the star symbol 214 at the head of the fourth source text unit is clicked in the state of FIG. 8 and a corresponding fourth target text unit is displayed at the top of the target text window 204.

FIG. 10 shows a state in which only the target text has been scrolled from the state of FIG. 9. In the target text window 204, the seventh target text unit is displayed at the top.

Displaying a source text corresponding to the seventh target text is carried out by clicking the star symbol 216 at the head of the seventh target text unit in the target text window 204.

Figure 11:
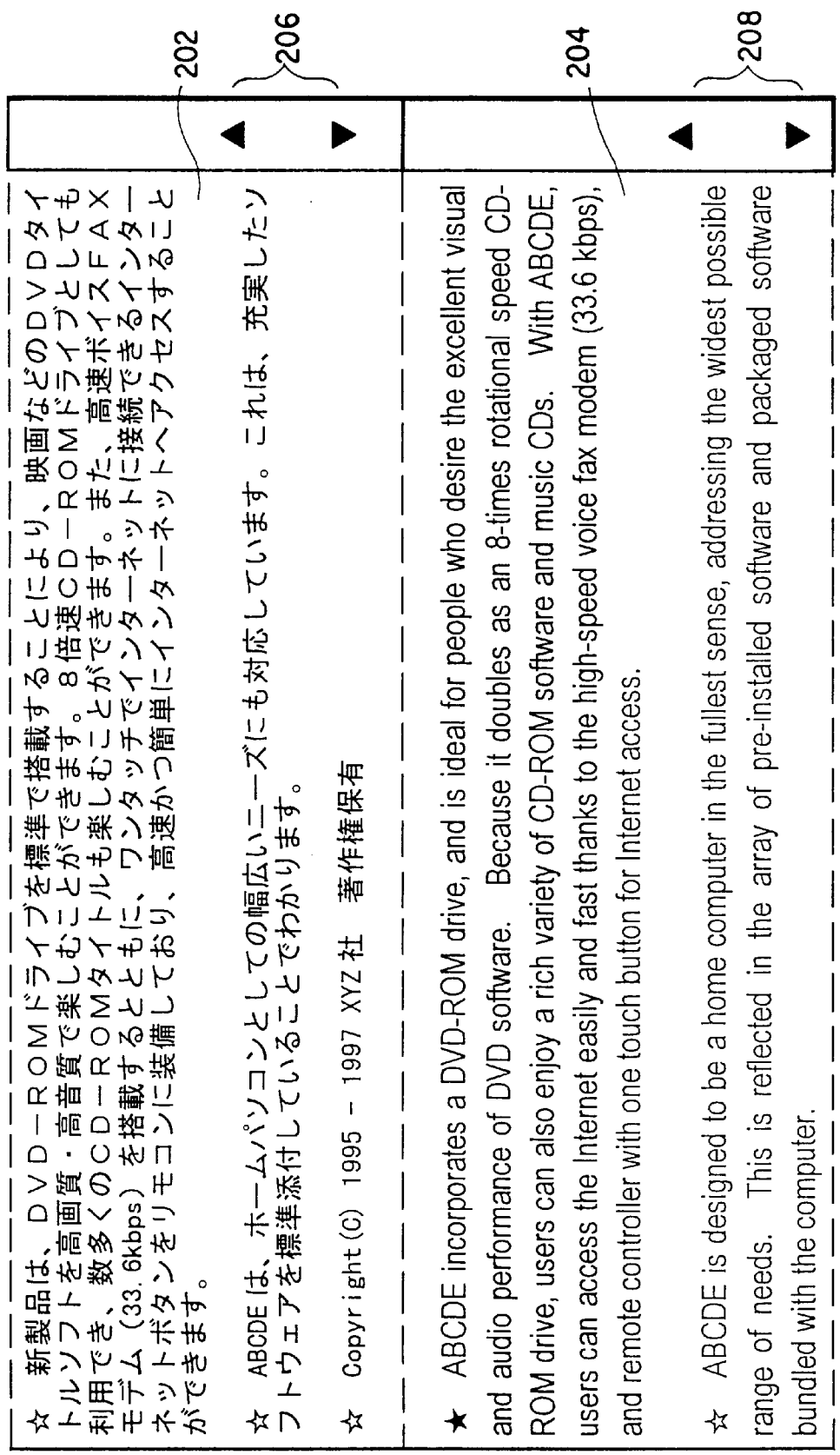
FIG. 11 is a diagram showing an example of display on the screen.

FIG. 11 shows a state just after the star symbol 216 at the head of the seventh target text unit is clicked in the state of FIG. 10 and here a seventh source text unit corresponding thereto is displayed at the top of the source text window 202.

Figure 12:
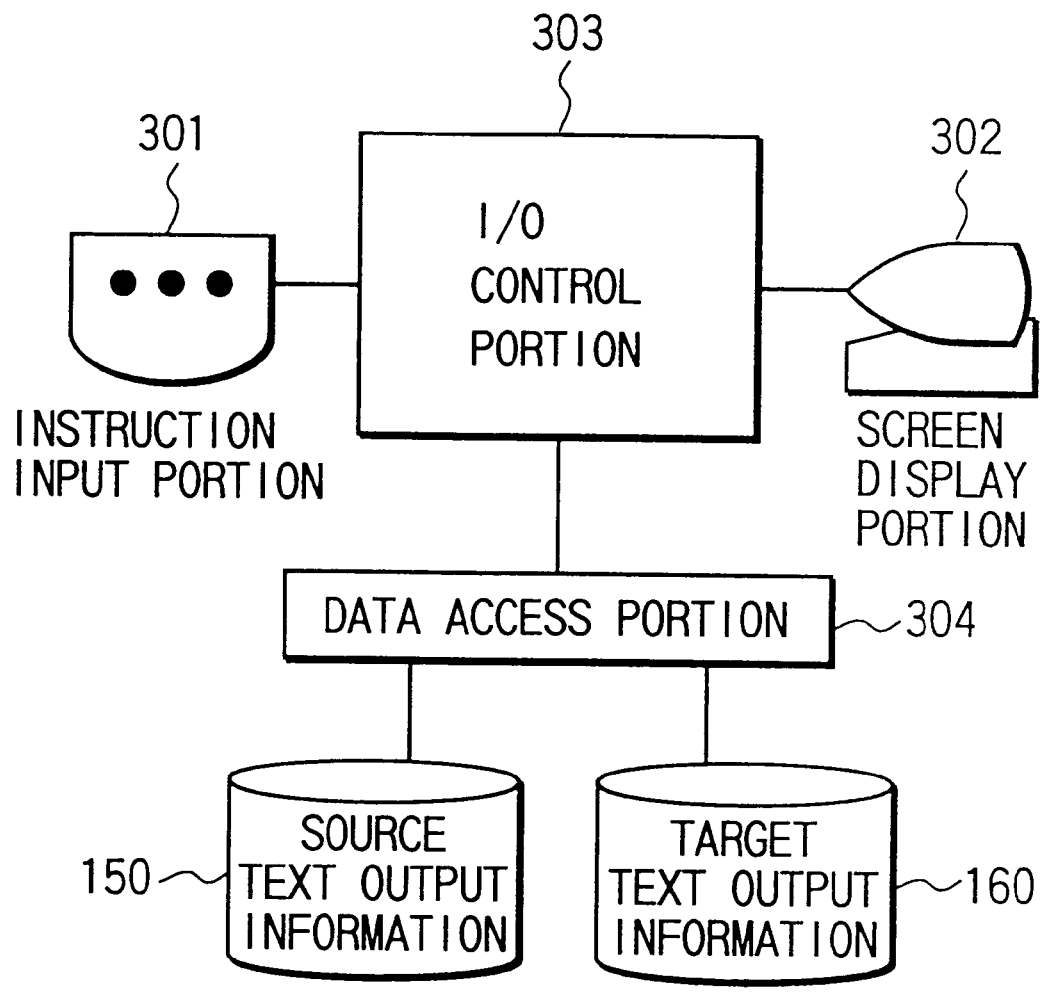
FIG. 12 is a block diagram showing an example of composition of a display portion.

FIG. 12 shows an example of composition of the above described hyper text browser.

This browser comprises an instruction input portion 301, a display portion 302, an I/O control portion 303 and a data access portion 304.

The instruction input portion 301 is used for giving instructions for the scroll in the display screen and source/target text corresponding symbols, and comprises a mouse or keyboard.

The display portion 302 is used for displaying a content of the source text and a content of the target text and comprises a CRT display unit or liquid crystal display unit.

The I/O control portion 303 interprets inputs from the instruction input portion 301, fetches out required source text data or target text data through the data access portion 304, and controls for displaying in the display portion 302.

The data access portion 304 accesses source text output information 150 or target text output information 160 according to instructions from the I/O control portion 303 and brings back required data to the I/O control portion 303.

Figure 13:
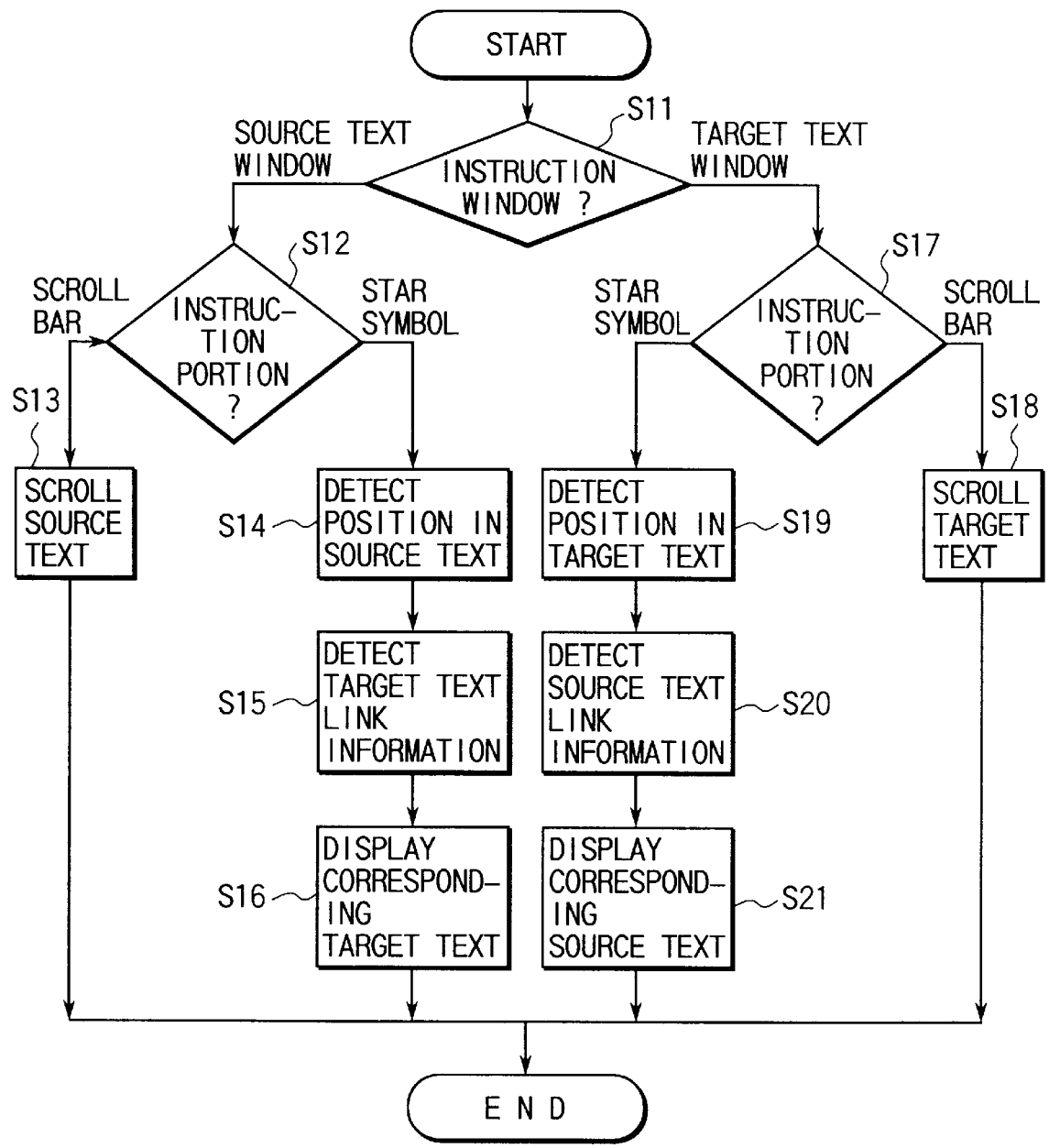
FIG. 13 is a flow chart showing an example of flow of processings in the display portion.

FIG. 13 is a flow chart showing an operation of the browser in FIG. 12.

In a first step S11, an instruction is received from the instruction input portion 301 so as to determine which the instruction input is carried out in the source text window or target text window. If it is the instruction input in the source text window, the processing proceeds to step S12 and if it is the instruction input in the target text window, the processing proceeds to step S17.

In step S12, it is determined whether an instruction position from the instruction input portion 301 is a scroll bar or star symbol. If it is an instruction input through the scroll bar, the processing proceeds to step S13, and if it is an instruction input through the star symbol, the processing proceeds to step S14.

In a case of instruction input through the scroll bar, in step S13, the source text is scrolled and displayed, and then the processing is terminated.

In a case of instruction input through the star symbol, in step S14, an instruction position from the instruction input portion 301 is detected, in step S15, source text output information is investigated so as to detect a corresponding target text link information, and in step S16, the target text is scrolled so as to display a portion obtained from the above target text link information from the target text output information, and the processing is terminated.

In step S17, it is determined whether an instruction position from the instruction input portion 301 is the scroll bar or the star symbol. If it is an instruction input through the scroll bar, the processing proceeds to step S18. If it is an instruction input through the star symbol, the processing proceeds to step S19.

In a case of instruction input through the scroll bar, in step S18, the target text is scrolled and then the processing is terminated.

In a case of instruction input through the star symbol, in step S19, an instruction position from the instruction input portion 301 is detected, in step S20, the target text output information is investigated so as to detect a corresponding source text link information and in step S21, the source text output information is scrolled so as to display a portion obtained from the source text link information in the source text window, and then the processing is terminated.

For description of the above source text output file and target text output file, description in HTML style can be used.

A case in which the HTML style is used for description of the source text output file in FIGS. 3 and 4 and the target text output file in FIGS. 5 and 6 will be described below.

FIGS. 14 and 15 show a case in which a content of the source text output file shown in FIGS. 3 and 4 is expressed in the HTML style. FIGS. 16 and 17 show a case in which a content of the target text output file shown in FIGS. 5 and 6 is expressed in the HTML style. Here, assume that a file name of the source text output file (150) is genbun.html and a file name of the target text output file (160) is yakubun.html.

First of all, the source text output file genbun.html will be described. <HTML> and <BODY> in the first two lines in FIG. 14 are tags indicating that the HTML style file begins here.

Next, a line of <A HERF="file:yakubun.html#T001" NAME="S001"><IMG SRC="file:star.gif"></A> describes a tag of HTML corresponding to the source-to-target link.

Here, HERF="file:yakubun.html#T001" corresponds to "target text link information" in FIGS. 3 and 4 and I a HTML tag for indicating that a portion of NAME="T001" in yakubun.html (target text output file) will be displayed if the star symbol is clicked.

NAME="S001" corresponds to "label information" shown in FIGS. 3 and 4 and is a HTML tag indicating a destination from yakubun.html file.

file:star.gif indicates a file in which images of star symbol (☆) shown in FIGS. 7–11.

Respective lines of <A HREF="file . . . (abbreviated) . . . :star.gif><A/> which appear subsequently in FIGS. 14, 15 are HTML tags corresponding to source-to-target link.

<BR> in this Figure is a HTML tag indicating a line feed.

</BODY>, </HTML> in the last two lines in FIG. 15 are tags indicating that the HTML style file is ending.

Next a target text output file, yakubun.html will be described.

<HTML>, <BODY> in the first two lines in FIG. 16 are tags indicating that the HTML style file is beginning.

A next line of <A HREF="file:genbuny.html#S001"NAME="T001"><IMG SRC="file.star.gif"></A> describes a HTM L tag corresponding to target-to-source link.

Here HREF="file:genbun.html#S001" corresponds to "source text link information" in FIGS. 5 and 6 and is a tag showing that a position of NAME="S001" in genbun.html (source text output file) is indicated when a star symbol is clicked.

NAME="T001" corresponds to "label information" in FIGS. 5 and 6 and is a HTML tag indicating a destination from genbun.html file.

file:star.gif indicates a file in which images of the star symbol (☆) shown in FIGS. 7 to 11 are stored.

Respective lines of <A HREF="file . . . (abbreviated) . . . :star.gif><A/> which appear subsequently in FIGS. 16 and 17 are HTML tags corresponding to source-to-target link.

<BR>in the Figure is a HTML tag showing a line feed.

</BODY>, </HTML> in the last two lines in FIG. 17 are tags indicating that the HTML style file is ending.

As described above, according to the first embodiment, corresponding to a plurality of component units of the first language text (Japanese source text unit here), a source text output file supplied with link information to component units of the second language text each corresponding thereto (English target text unit here) can be obtained. At the same time, corresponding to the plurality of component units of the second language text, a target text output file supplied with link information to the component units of the first language text each corresponding thereto can be obtained.

By supplying the obtained source text output file and target text output file to the display means, it is possible to display both the source text and the target text in corresponding relation on an existing single Internet browser by only using an existing hyper text.

More specifically, the first language text and the second language text are displayed in separate fields (e.g., windows) in the above browser and by scrolling only the first language text or the second language text to meet a user request, it is possible to display a component unit of the second language text or the first language text corresponding to the first language text or the second language text currently being displayed.

As a result, the target text can be read in correspondence with its source text as required while holding an image of the source text on a single browser. Thus, flexible, user-friendly display of the source/target text can be attained.

Although it has been described that this embodiment is realized by displaying the windows separately on a single Internet browser without requiring independent browsers for each of two languages, it is permissible to activate different browsers for the source text and the target text and supply these browsers with the above source text output file and target text output file thereby realizing the display of the source/target text according to the present invention with a plurality of browsers.

Although in the examples shown in FIGS. 7 to 11, the star symbols are attached to the head of each unit so that a corresponding unit is displayed by specifying it by clicking the star symbol with a mouse or the like, a mark other than the star symbol may also be used.

Further it is permissible to make the corresponding unit displayed by double clicking an arbitrary character string in the unit without clicking the star symbol or the like. More specifically, by double clicking an arbitrary character string in the fourth source text in a state in which the fourth source text unit is displayed, a corresponding fourth target text unit is displayed. Likewise, by double clicking an arbitrary character string in a seventh target text unit in a state in which the seventh target text unit is displayed, a corresponding seventh source text unit is displayed. In this case, it is permissible to mark the star symbol or the like at the head of each unit as a symbol for distinguishing from neighboring units or make a device so as to not display the star symbol or the like.

Further, it is permissible to use simultaneously an instruction by clicking the star symbol or the like at the head of each unit and an instruction by double clicking an arbitrary character string in each unit.

[Second embodiment]

Although there is no hierarchy in a relation of correspondence between the source text and the target text in the above first embodiment, it is possible to make corresponding units between the source text and target text hierarchical.

FIGS. 18, 19 and 20 indicates a content of the source text output file in a case in which the source text units are made hierarchical (two levels in this case) such that the label information and link information are attached in duplex manner.

FIGS. 21, 22 and 23 indicates a content of the target text output file in a case in which the target text units are made hierarchical (two levels in this case) such that the label information and link information are attached in duplex manner.

In this case, the upper level unit is a paragraph and the lower level unit is a sentence.

Here, information surrounded by <<>> such as <<label information #S001>> and << target text link information #T001>> is information corresponding to the upper level unit and information surrounded by <> such as <label information #S001> and <target text link information #T004-1> is information corresponding to the lower level unit. If information corresponding to the upper level unit is the same as information corresponding to the lower level unit, the information corresponding to the lower level unit is omitted.

By such hierarchy of the units, it is possible to display the source text and the target text correspondingly either in the unit of a paragraph or in the unit of a sentence.

FIGS. 24 to 28 show an example of display in correspondence relation in the case in which the units are made hierarchical as shown in FIGS. 18 to 20 and FIGS. 21 to 23.

FIG. 24 shows an initial state of screen division display in the browser.

The source text is displayed in the upper window or the source text window 202 and the target text is displayed in the lower window or the target text window 204 such that the units are sequentially displayed from the first upper level unit.

The star symbols 210, 212 at the head of each upper level unit indicates link information holding a correspondence between the upper level units from the source text to the target text or from the target text to the source text, which can be used by a user for instruction. This is the same as an example shown in FIGS. 7 to 11.

Further, diamond marks (◊) 230, 232 at the head of each lower level unit indicate link information holding a correspondence between the lower level units from the source text to the target text or from the target text to the source text, which can be used by a user for instruction.

Figure 25:
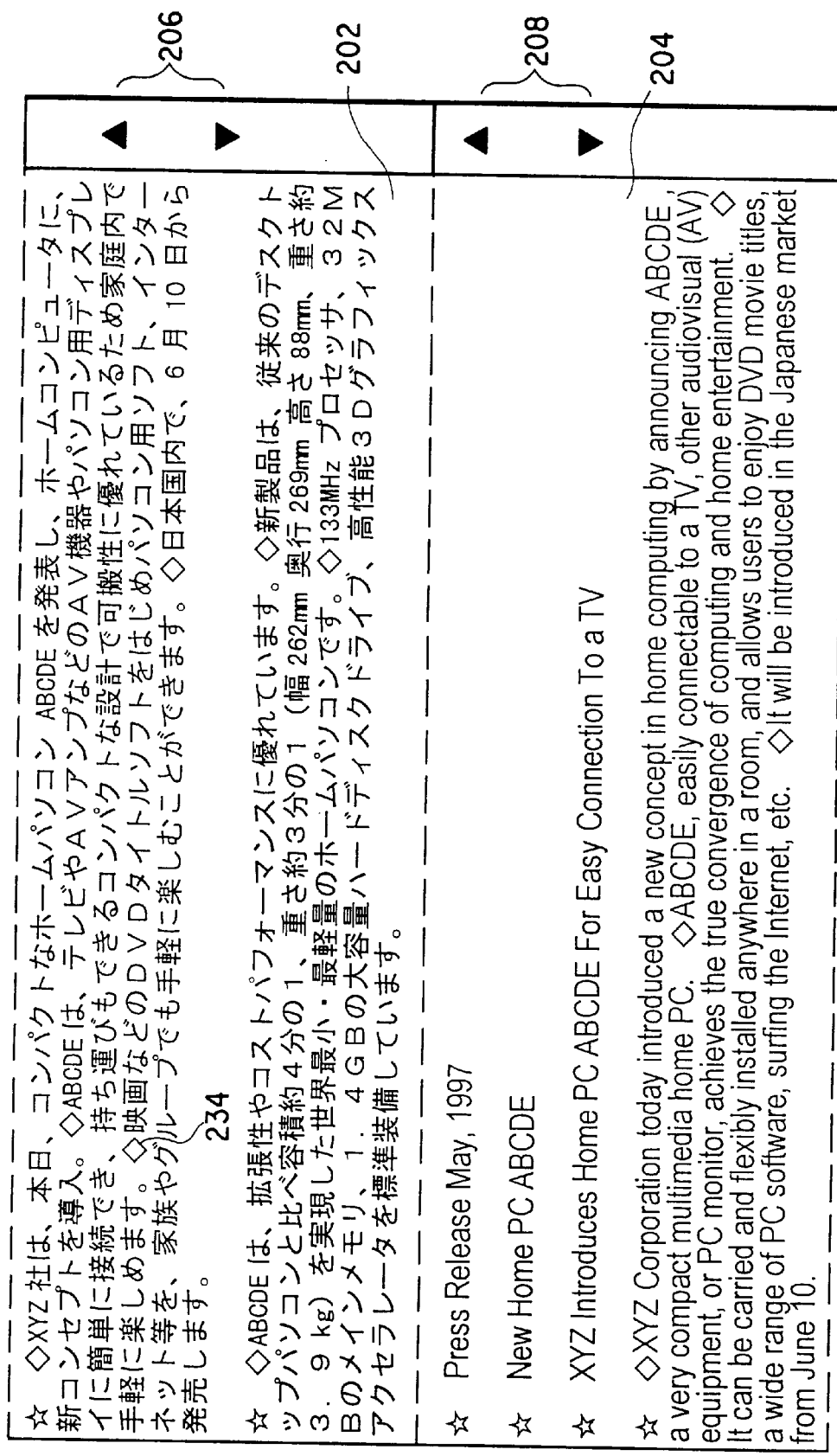
FIG. 25 is a diagram showing an example of screen display in which the units are made hierarchical.

FIG. 25 shows a state in which only the source text has been scrolled from the state of FIG. 24. Display of a target text corresponding to a third lower level unit in a fourth upper level unit is carried out by clicking a diamond mark 234 at the head of the third lower level unit in the fourth upper level unit in the source text window 202.

FIG. 26 shows a state just after the diamond mark 234 at the head of the third lower level unit in the fourth upper level unit is clicked in the state shown in FIG. 25 and the corresponding third lower level unit in the fourth upper level unit is displayed at the top of the target text window 204.

FIG. 27 shows a state in which only the target text has been scrolled from the state shown in FIG. 26. In the target window 204, a seventh upper level unit is displayed.

Display of a source text corresponding to a second lower level unit in a seventh upper level unit is carried out by clicking a diamond mark 236 at the head of a second lower level unit in a seventh upper level unit in the target text window 204.

Figure 28:
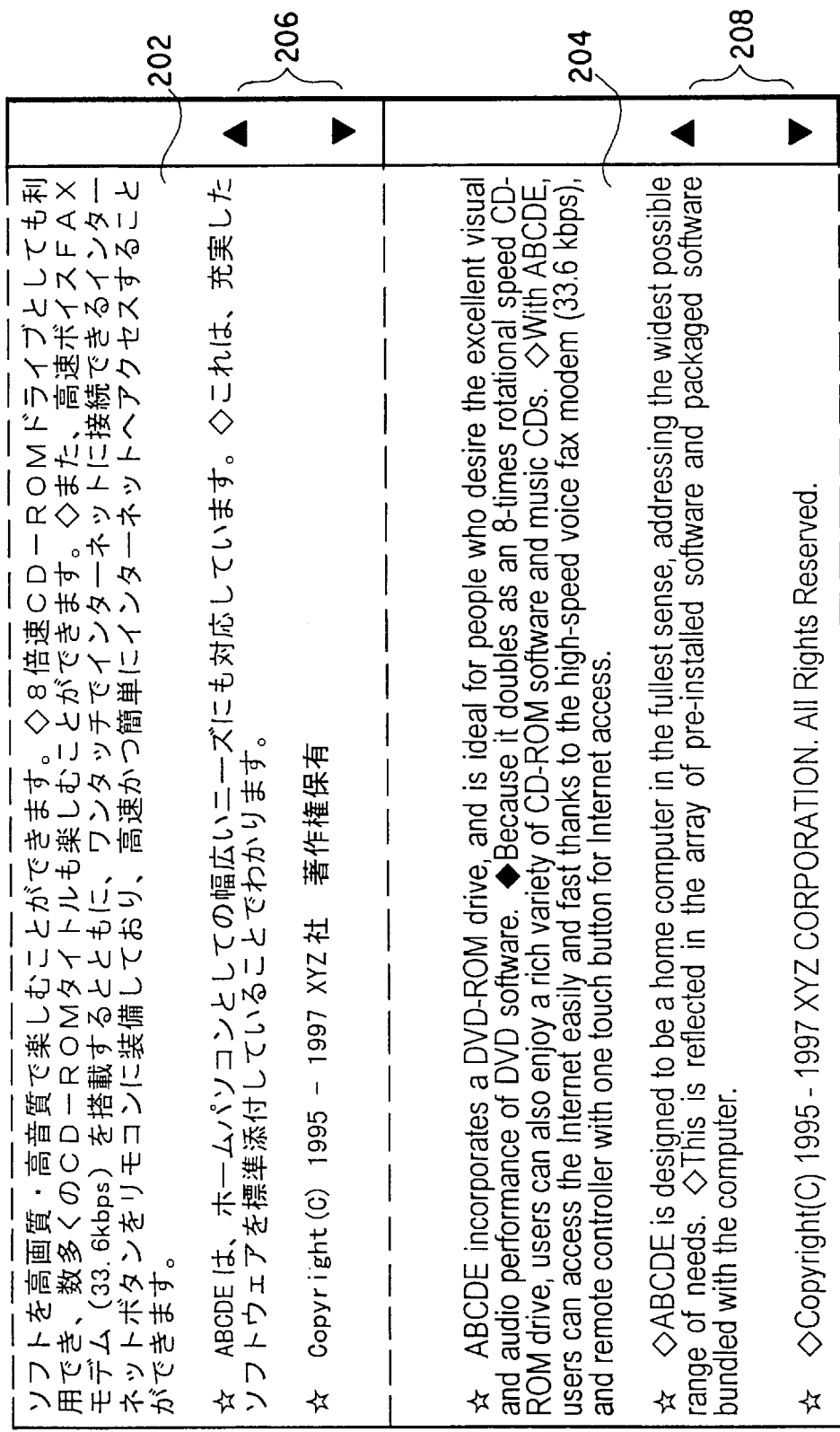
FIG. 28 is a diagram showing an example of screen display in which the units are made hierarchical.

FIG. 28 shows a state just after the diamond mark 236 at the head of the second lower level unit in the seventh upper level unit of the target text is clicked from the state shown in FIG. 27 and a corresponding second lower level unit in a seventh upper level unit of the source text is displayed at the top of the source text window 202.

Meanwhile the HTML style description can be used for the source text output file and the target text output file having the above-described hierarchical structure.

[Third embodiment]

A third embodiment concerns an example in which the machine translation apparatus containing the display means described in the first embodiment has been realized on a computer.

The machine translation apparatus according to the present embodiment can be realized by executing a program on a CPU. In this case, the machine translation apparatus as hardware comprises a CPU, RAM for storing programs and necessary data, I/O devices and a storage device such as a hard disk unit. The text dividing portion 120, the translation portion 130 and the corresponding link applying portion 140 are programs in which their processing procedure (e.g., procedure shown in FIG. 2) is described and realized by a program for controlling the computer. The source 3 text information 110, the source text output file 150, the target text output file and the like are stored and accumulated in the storage device such as a hard disk unit. Thus, the text dividing portion 120 and the corresponding link applying portion 140 include programs for accessing the storage device.

A program describing the processing procedure for the text dividing portion 120, the translation portion 130 and the corresponding link applying portion 140 as shown in FIG. 2 for controlling the computer is stored in RAM and executed by the CPU. The CPU performs arithmetic operation and controls the I/O device and storage device according to a procedure described in a program stored in the RAM so as to realize desired functions.

Although the aforementioned program may be stored in the ROM, it is permissible to install that program in a general purpose computer and realize the program. That is, the aforementioned program is stored in a medium which the computer can read (e.g., floppy disk, CR-ROM or other storage medium), and that program is read by means of a disk drive unit suitable for the storage medium, stored in the RAM and executed. Or the program is installed in the hard disk or the like, and upon execution, it is stored in the RAM from the hard disk or the like and executed. If the storage medium in which the program is stored is an IC card, that program can be read by use of an IC card reader. Or the program can be received from a predetermined interface through a network.

Here, the aforementioned display device can be realized in the form of a display tool or program. Thus although the machine translation apparatus and the display device can be realized by different computers, it is possible to install the aforementioned machine translation program on a display tool or a computer in which a predetermined browser is activated and execute that program.

[Fourth embodiment]

Figure 29:
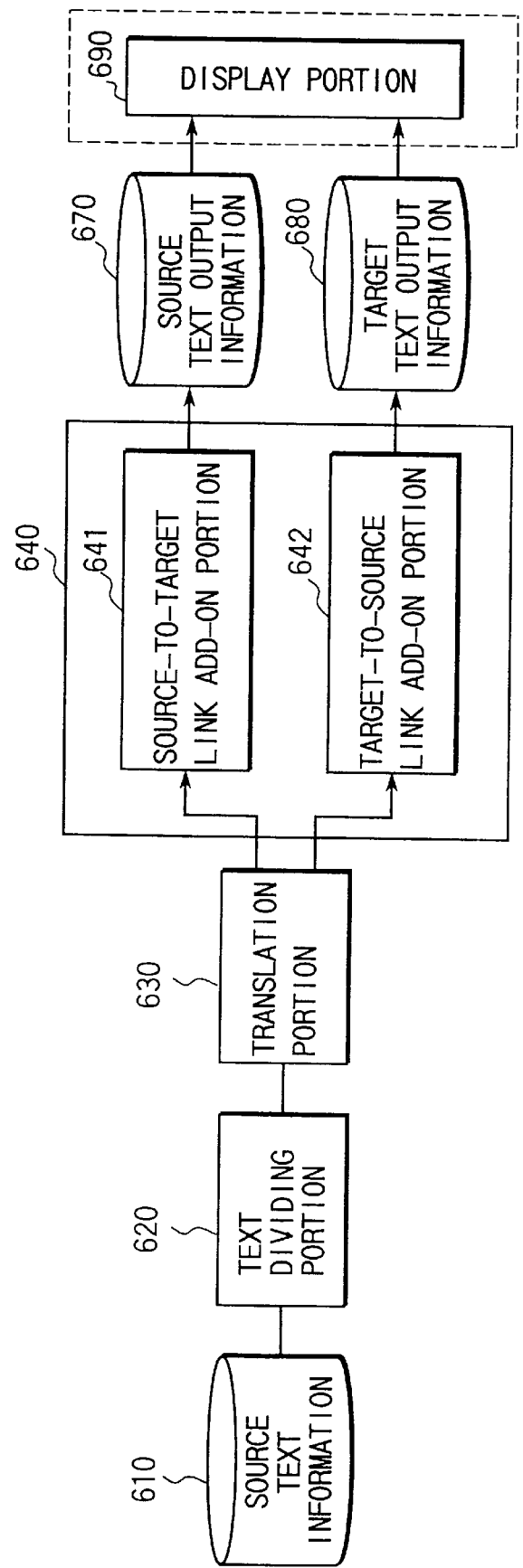
FIG. 29 is a block diagram showing composition of the machine translation apparatus according to a fourth embodiment of the present invention.

FIG. 29 is a block diagram showing the composition of the machine translation apparatus according to a fourth embodiment.

The machine translation apparatus according to this embodiment comprises a text dividing portion 620, a translation portion 630, a corresponding link applying portion 640 and a display portion 690. The corresponding link applying portion 640 comprises a source-to-target link add-on portion 641 and a target-to-source link add-on portion 642.

The text dividing portion 620, the translation portion 630, the corresponding link applying portion 640, the corresponding link applying portion 640, the source-to-target link add-on portion 641 and the target-to-source link add-on portion 642 in FIG. 29 correspond to the text dividing portion 120, the translation portion 130, the corresponding link applying portion 140, the corresponding link applying portion 140, the source-to-target link add-on portion 141 and the target-to-source link add-on portion 142.

The display portion 690 shown in FIG. 29 is a browser of hyper text as described above, having a composition as shown in FIG. 12.

Source text information 610 shown in FIG. 29 corresponds to the source text information 110 of FIG. 1.

The source output information 670 is data of concatenation of the source text units output from the corresponding link applying portion 640, supplied with label information and target text link information and equal to the source text output information 150 shown in FIG. 1.

The source output information 680 is data of concatenation of the source text units output from the corresponding link applying portion 640, supplied with label information and target text link information and corresponds to the target text output information 160 shown in FIG. 1.

The display portion 690 displays the source text output information 670 and the target text output information 680 in correspondence relation as shown in FIGS. 7 to 11. Details thereof correspond to those discussed previously with regard to the first embodiment.

This embodiment has two functions, a translation function comprising the text dividing portion 620, the translation portion 630 and the corresponding link applying portion 640, and a display function including the display portion 690. The following execution control a is carried out to utilize these functions effectively.

That is, (1) The translation function and the display function are activated independently by a user.

(2) The display function is exerted after the translation function is executed.

(3) With the translation function being always activated, the translation function is executed by a user's instruction.

A case of realizing the text dividing portion 620, the translation portion 630, the corresponding link applying portion 640 and the display portion 690 on the computer has been described in the third embodiment. In the execution control as described in the above (2), (3), a program in which the processing procedure of the execution control function is described is created and stored in a storage medium which the computer can read, and the program is read by a disk drive unit suitable for the storage medium and executed in the CPU.

Although the respective embodiments have been described with regard to a Japanese-English machine translation apparatus in which the source language is Japanese and the target language is English as an example, the present invention does not restrict a combination of the source language and the target language, but the present invention may be applied to various machine translation apparatuses such as, for example, a machine translation apparatus in which the source language is German and the target language is Japanese or a machine translation apparatus in which the source language is Japanese and the target language is English.

The present invention is not restricted to the above described embodiments but may be modified in various ways within its technical range.

According to the present invention as described above, link information to a component unit of the second language text is added to a corresponding component unit of the first language text and then link information to a component unit of the first language text is added to a corresponding component unit of the second language text. Thus by dividing the window screen in an existing single display unit (display tool), for example, an Internet browser, files in which the source text units correspond to the target text units can be created.

According to the present invention, the first language text and the second language text are displayed in separate areas (e.g., windows) on a single display unit, for example, the Internet browser, and the first language text or the second language text are scrolled independently so that a component unit of the second language text or the first language text corresponding to a component unit of the first language text or the second language text currently being displayed can be displayed.

As a result, a user can read a target text in correspondence with its source text as required on a single browser while keeping an image of the source text. Therefore, according to the present invention, it is possible to provide a flexible, user friendly machine translation method and source/target text display method.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A machine translation method in which, a plurality of text files are browsed, and a desired one of the texts is selected and translated, said method comprising the steps of:
    dividing a text of a first language subject to translation into a plurality of component units;
    generating a plurality of component units of a second language by translating said plurality of component units of the first language text;
    adding link information for component units of the second language text to each of the component units of said first language text; and
    adding link information for component units of the first language text to each of the component units of said second language text.

2. A machine translation method according to claim 1, wherein said component unit of at least one of said first language text and said second language text is composed of lower level component units which are made hierarchically with two or more levels, said method further comprising: adding said link information to be added to said first language text and said second language text corresponding to each of the levels.

3. A machine translation method according to claim 1, wherein said component unit of at least one of said first languages text and said second language text is a paragraph or a sentence.

4. A machine translation method according to claim 1, wherein the first language text and the second language text to which said link information is added is hyper text.

5. A machine translation apparatus in which, a plurality of text files are browsed, and a desired one of the text is selected and translated, said apparatus comprising:
    a dividing means for dividing a text of a first language subject to translation into a plurality of component units;
    a generating means for generating a plurality of component units of a second language by translating said plurality of component units of the first language text; and
    a link information adding means for adding link information for component units of the second language text to each of the component units of said first language text and adding link information for component units of the first language text to each of the component units of said second language text.

6. A machine translation apparatus according to claim 5, wherein said component unit of at least one of said first language text and said second language text is composed of lower level component units which are made hierarchically with two or more levels, said link information adding means adding said link information for said first language text and said second language text in correspondence with each other to each level.

7. A machine translation apparatus according to claim 5, wherein said component unit of at least one of said first language text and said second language text is a paragraph or a sentence.

8. A machine translation apparatus according to claim 5, wherein the first language text and the second language text to which said link information is added is hyper text.

9. A machine translation apparatus according to claim 5, further comprising a display means for displaying said first language text and said second language text in correspondence with each other.

10. A source/target text display method for displaying a component unit of a first language text subject to translation and a said second language text which is a result of translation while said component unit of said first language text is supplied with link information for a corresponding component unit of second language text and said component unit of said second language text is supplied with link information for a corresponding component unit of first language text, said method comprising the steps of:
    displaying said first language text and said second language text in separate display fields;
    scrolling, when an instruction for scrolling said first language text or said second language text, instructed first language text or second language text; and
    displaying, when an instruction for displaying a component unit of said language text or said first language text corresponding to a specified component unit of said first language text or second language text being displayed is input, the component unit of said second language text or first language text according to said link information attached to the specified component unit of said first language text or second language text.

11. A source/target text display method according to claim 10, wherein when the component unit of said second language text or first language text is displayed according to said link information, the component unit of said corresponding second language text or first language text is displayed at a position equivalent to the position in a window in which the specified component unit of said first language text or second language text is displayed.

12. A source/target text display method according to claim 10, wherein said component unit of at least one of said first language text and said second language text is composed of lower level component units which are made hierarchically with two or more levels, said method further comprising: adding said link information to be added to said first language text and said second language text corresponding to each of the levels.

13. A source/target text display method according to claim 10, wherein said component unit of at least one of said first language text and said second language text is a paragraph or a sentence.

14. A computer-readable medium having computer program code means embodied therein for causing a plurality of text files to be browsed, and a desired one of the texts to be selected and translated, the computer readable program code means comprising:

instruction means for causing a computer to divide a text of a first language subject to translation into a plurality of component units;

instruction means for causing a computer to generate a plurality of component units of a second language text by translating said plurality of the component units; and instruction means for causing a computer to add link information for the component unit of the second language text to a corresponding component unit of said first language text and add link information for the component unit of the first language text to a corresponding unit of said second language text.

15. A computer-readable medium comprising:

instruction means for causing a computer to input a first language text subject to translation and a second language text which is a result of translation, a component unit of said first language text being provided with link information for a corresponding component unit of the second language text and a component unit of said second language text being provided with link information for a corresponding component unit of the first language text;

instruction means for causing a computer to display said first language text and said second language text in separate display fields;

instruction means for causing a computer to scroll, when an instruction for scrolling the first language text or second language text is input, an instructed one of said first language text or said second language text; and instruction means for causing a computer to display, when an instruction for displaying a component unit of a second language text or a first language text corresponding to a specified component unit of said first language text or said second language text currently being displayed is input, the component unit of the second language text or first language text according to link information attached to a corresponding component unit of said first language text or said second language text.

* * * * *